UNITED STATES PATENT OFFICE.

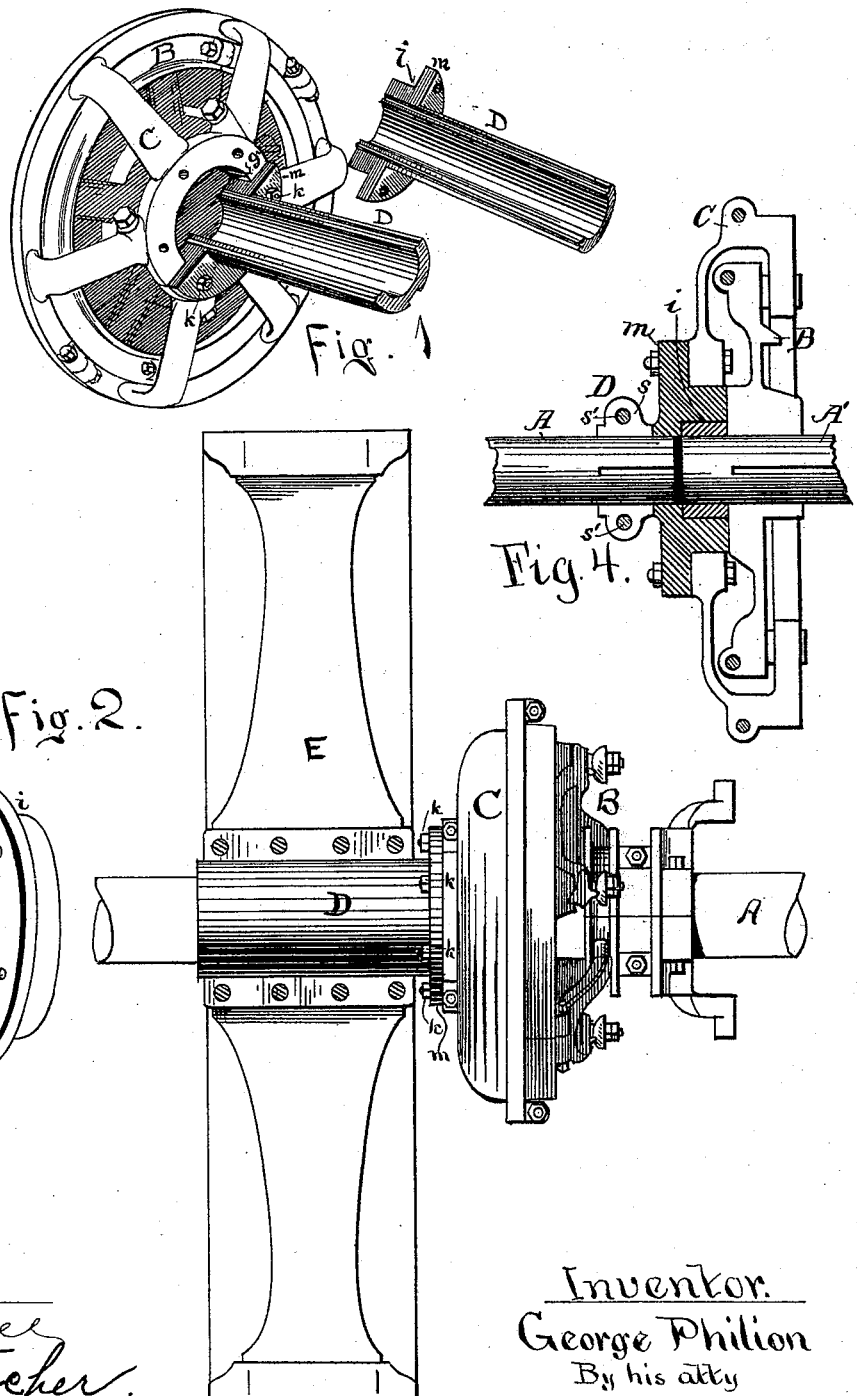

GEORGE PHILION, OF MISHAWAKA, INDIANA.

FRICTION-CLUTCH.

SPECIFICATION forming part of Letters Patent No. 498,300, dated May 30, 1893.

Application filed April 22, 1892. Serial No. 430,216. (No model.)

*To all whom it may concern:*

Be it known that I, GEORGE PHILION, of Mishawaka, in St. Joseph county, in the State of Indiana, have invented new and useful Improvements in Friction-Clutches; and I do hereby declare that the following is a full and accurate description of the same, reference being had to the accompanying drawings, wherein—

Figure 1 is a perspective view of my invention. Fig. 2 is a side elevation showing the manner of use; one half of the pulley being removed, and a smaller form of clutch being shown. Fig. 3 is a perspective view of a hub suitable for use with the clutch for a cut-off coupling. Fig. 4 is a sectional view of that form of the clutch shown in Fig. 3, illustrating the manner of applying the same to couple two shafts which are in line with each other.

Friction clutches are frequently employed in connection with pulleys to render the same fast or loose, as may be desired; one member of the clutch being locked to the shaft, another being locked to the pulley. They are also frequently used as cut-off couplings to connect sections of shafting.

Clutches used with pulleys are connected with the pulleys in a variety of ways. Sometimes one member of the clutch is integral with the pulley, sometimes it is bolted to the hub or arms of the pulley; but the extensive adoption of split wooden pulleys has created call for another variety of clutches, viz: clutches with long cylindrical hubs upon which the split pulley may be clamped and secured exactly the same as upon the shaft. To meet this requirement one member of the clutch has heretofore been cast integral with a hub sufficiently long to extend through the hub of the pulley, for which it was designed. But this method involves several inconveniences and difficulties, to-wit: The demand as to length of hub and diameter of shaft bore, is so varied that it is practically impossible to anticipate them and carry clutches in stock. This therefore requires each clutch to be made to order, at least as to the hub member, and this in turn involves undesirable delay in delivery. And in addition to the inconveniences above named, the convenient handling and machining of the long hub with the large friction ring of the clutch attached at one end, requires lathes of special form and costly make, and this enhances the cost of construction. To obviate these difficulties, I have constructed the hub separate from the clutch, and am thereby enabled to construct the friction and operative members of the clutch without reference to any conditions except power to be transmitted, and can therefore construct such parts in advance and carry them in stock. The hubs can also be, with little expense, carried in assortment and being interchangeable, it follows that the clutch of desired power can be taken out of stock, and fitted with the required hub also taken out of stock, or, if that happens not to be possible, the turning and boring of the hub is a comparatively small matter, which can be executed in a few hours. The hubs being interchangeable, renders it possible to fit the same friction rings for use as pulley or cut-off couplings, a thing not heretofore possible, though frequently convenient. The machining of friction ring and hub separately, may be accomplished, also upon lathes of ordinary style and adaptation.

I am aware that clutches have been made separable in a great variety of ways and that the hub parts have sometimes been separable from the friction members. I am also aware that in pulleys and other like things, it has not been uncommon to bolt hub pieces to the other parts, but none of these instances, or so far as I am aware, have been either designed or adapted to meet the requirements of the use for clutches with split pulleys, above mentioned; a demand which has grown up within a very few years, during which the use of split wood pulleys has become almost universal.

Having now indicated the nature of my invention, I will particularly describe the structure of it which I have found so satisfactory that the former method has been abandoned.

A is the shaft.

B is the running member of the clutch, which is rigidly secured to the shaft by keys or otherwise.

C is the loose member of the clutch, which is mounted loosely upon the shaft and is locked to the running member by the action of the friction devices of the clutch.

D is the hub made separate from the clutch and secured thereto by bolts. These parts are for convenience divided longitudinally in halves, so that they can be placed upon a shaft without removing it from its journal boxes.

E is one half a split pulley, in position on the hub D.

When used as a cut-off coupling, the hub, Fig. 3, is used. It is not necessary that the hub should be split, because it is sometimes placed at the end of the shaft. I prefer, however, to split it part way, as shown at $s$ in Figs. 3 and 4. The clamp bolts $s'$ will then serve to compress the hub upon the shaft sufficiently to receive strong frictional contact.

In constructing the clutches, the center hub seat $g$ is bored to some standard diameter and the hub flanges $m$ and ends $i$ are all turned to the same standard, and can be interchangeable. The center bore of the hub must be proper for the shaft upon which it is to be placed, and when to carry a pulley the length and exterior diameter of the hub must adapt it to said pulley. The hub and friction member C are secured together by means of bolts $k$ whereof the heads are concealed within the member C, and the nuts are on the outside. By this means, when it becomes necessary to re-babbitt the hub it may be removed from the shaft and from the clutch by removal of the nuts $k$ and replaced as easily. This is a convenience of considerable importance as it obviates labor necessary in taking the clutch apart, and does not disturb any of its adjustments.

The pulley E may sometimes be used as a driving pulley and the part C will then be the running part, and the part B and shaft A will be standing parts, but this change will not involve any variation whatever in the structure or mode of operation of the several parts of the device. When used for a cut-off coupling both parts are rigidly secured to their respective parts A A' of the shaft.

Having described my invention, I claim as new—

1. In a clutch the combination of a clutch member having the hub seat $g$ bored to a standard size, the hub made separate from said clutch member and provided with the cylindrical end or shoulder $i$ formed of a size to fit said seat, having the flange $m$ and formed at its end beyond said flange with the cylindrical sleeve, substantially as set forth.

2. In a clutch, adapted to be used as a shaft coupling, the combination of the clutch member provided with the hub seat $g$ bored to a standard size, and the hub provided with the shoulder or bearing $i$ formed of a diameter to fit said seat, having the flange $m$, and beyond said flange with the split sleeve adapted to be compressed upon the end of the shaft, substantially as set forth.

GEORGE PHILION.

In presence of—
R. D. O. SMITH,
D. O. FONDA.